United States Patent
Kerjean et al.

[11] Patent Number: 5,912,971
[45] Date of Patent: *Jun. 15, 1999

[54] USER-ADDRESSING METHOD AND RECEIVER IN AN AUTHORIZED ACCESS TELEVISION SYSTEM

[75] Inventors: Jean-Marie Kerjean, Ville D'Avray; Jacques Le Berre, Puteaux, both of France

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/567,251

[22] Filed: Dec. 5, 1995

[30] Foreign Application Priority Data

Dec. 7, 1994 [FR] France .................................. 94 14728

[51] Int. Cl.$^6$ ............................ H04N 7/167; H04N 7/00; H04B 17/00
[52] U.S. Cl. .................................... 380/20; 348/1; 348/2; 348/3; 455/2
[58] Field of Search ................................ 380/20; 455/2; 348/1–3

[56] References Cited

U.S. PATENT DOCUMENTS 3,230,302  1/1966  Bruck et al. .
4,268,859  5/1981  Ost .
4,292,650  9/1981  Hendrickson .

OTHER PUBLICATIONS

"Conditional Access Broadcasting :Datacare 2", BBC Research Dept. Report, No. 10, Aug. 1988, No. 10. D.T. Wright, C. Eng.

Primary Examiner—Stephen C. Buczinski
Attorney, Agent, or Firm—Laurie E. Gathman

[57] ABSTRACT

A collective address is defined at the transmitter end, not only by the contents of a field of bits, but also by a compulsory position of said field in a word which is larger than said field. Said word is full of zeros, outside said field.

To recognize in a receiver whether a message received from the transmitter is concerned, a word having the same length as the word, transmitted with its zeros, is constructed by placing several fields (CA1, CA2, . . . , CA10) end to end, each field corresponding to the contents of one of the multiple addresses concerning the receiver, and being also placed in its compulsory position, this word is compared with the received collective address word, while one similar field in the two words is searched separately for each field, the message is recognized if such a similar field is found.

8 Claims, 2 Drawing Sheets

| CA6 | 0101 |

FIG.1

| 0000 | 0000 | 0000 | 0000 | 0000 | CA6 | 0000 | 0000 | 0000 | 0000 |

FIG.2

| CA1 | CA2 | CA3 | CA4 | CA5 | CA6 | CA7 | CA8 | CA9 | CA10 |

FIG.3

USER-ADDRESSING METHOD AND RECEIVER IN AN AUTHORIZED ACCESS TELEVISION SYSTEM

BACKGROUND OF THE INVENTION

1. Field of the Invention

The invention relates to a user-addressing method in an authorised access television system in which a transmitter transmits collective address words enabling selection of a group comprising a plurality of special users for each of these words.

The invention also relates to a receiver for enabling a user to receive transmissions in which collective addresses are used, provided with a memory which contains information components defining a plurality of collective addresses which are different from each other but all of which concern said user.

2. Description of the Related Art

For managing the right of access by users in such an authorised access television system, one should be able to select a group of special users so as to address to them a message of controlling the rights of access concerning these users. The addressing mechanisms currently used in the majority of systems allowing conditional access use a set of addresses specifying the receiver which they address. Particular distinction can be made between:

the unique address specifying a sole user, the shared address specifying, for example the group of clients of a given program operator, the collective address specifying a group of users each having something in common, for example "the petanque players of Tokyo".

A user receiver is informed in advance of the definitions of the different collective addresses concerning this receiver, which addresses are registered in a memory. At the receiver end, for recognizing whether an address word received from a transmitter concerns the receiver, it is searched whether this address word contains an address which is identical to one of those registered in the memory. This process is referred to as "filtering" and the means for realising this process are referred to as "filters".

As far as the collective addresses are concerned, several operators of different programs may address users in this way and each operator has his own manner of defining groups. There is a different address for each definite group and each operator has his own addresses; this finally leads to a large number of addresses. The total number of addresses to be treated by a receiver may thus exceed the number of filters which it has for the acquisition of messages.

A known collective address system is specified in the European standard for television scrambling, referred to as "Eurocrypt". In accordance with this standard, an address of twelve bits is defined for a collective address and the selection is realised at the user end by comparison with a word of twelve bits.

SUMMARY OF THE INVENTION

It is an object of the invention to provide a method of addressing groups with which the use of various addresses according to the operator is possible, while using a single filtering criterion upon reception.

To this end, the invention is characterized in that a collective address word has a given overall length which is divided into several sections of equal length, placed end to end, a collective address is defined by a data expressed by a field of bits having a length which is equal to the length of one of said sections, and a compulsory position corresponding to one of said sections in the collective address word, a collective address word is transmitted by the transmitter in the form of a word having said overall length, whose section corresponding to the compulsory position for this address comprises the field of bits of the address and the rest of which is composed of bits which are all identical.

The invention is thus based on the recognition of defining an address not only by its contents but also by its position in a word which is larger. This provides the possibility of distinguishing the addresses in a larger number than the number which would be authorised by the number of bits of the field, by treating several addresses simultaneously by means of a device which is normally provided for a longer word. If the overall length of the word covers forty bits, the length of the collective address may advantageously cover four bits.

Although four bits permit counting to sixteen only, there will finally be one hundred and sixty different addresses in this case, which may be distinguished from each other, as there are also ten possible different positions.

Each information component defining a collective address concerning said user is advantageously stored in the form of two variables, one of which defines said compulsory position and the other defines the contents of said field of bits.

At the user end, the following method according to the invention is used in order to better exploit the structure defined for the word, so as to recognize whether a message received from the transmitter concerns this user:

a word having a length which is equal to said overall length is constructed by placing several fields end to end, each corresponding to said contents of an address taken from said plurality of collective addresses available to the user receiver, each of these fields being placed in the compulsory position defined for the address, this word is compared with the collective address word of the received message, while conformity between the two words is searched separately for each field, the message is recognised if one identical field is found.

A receiver is advantageously provided with means for generating several fields of bits each corresponding to said contents of an address taken from said plurality of collective addresses available to the user receiver, and for placing each of these fields end to end in the compulsory position defined for the address so as to constitute a word having a length which is equal to said overall length, and means by which an identical field in the constituted word and in the collective address conveyed by the received message is searched separately for each field, when said receiver receives a message.

To this end, it comprises, for each of said different collective addresses, a first memory location for a variable which defines said compulsory position and a second memory location for a variable which defines the contents of said field of bits.

These and other aspects of the invention will be apparent from and elucidated with reference to the embodiments described hereinafter.

BRIEF DESCRIPTION OF THE DRAWINGS

In the drawings:

FIG. 1 shows a registering zone in a memory of a receiver for data defining a collective address, FIG. 2 shows a collective address word transmitted by the transmitter, FIG. 3 shows a word comprised of several fields placed end to end, which fields correspond to contents of addresses taken from a plurality of collective addresses stored in a receiver.

Figure 4:
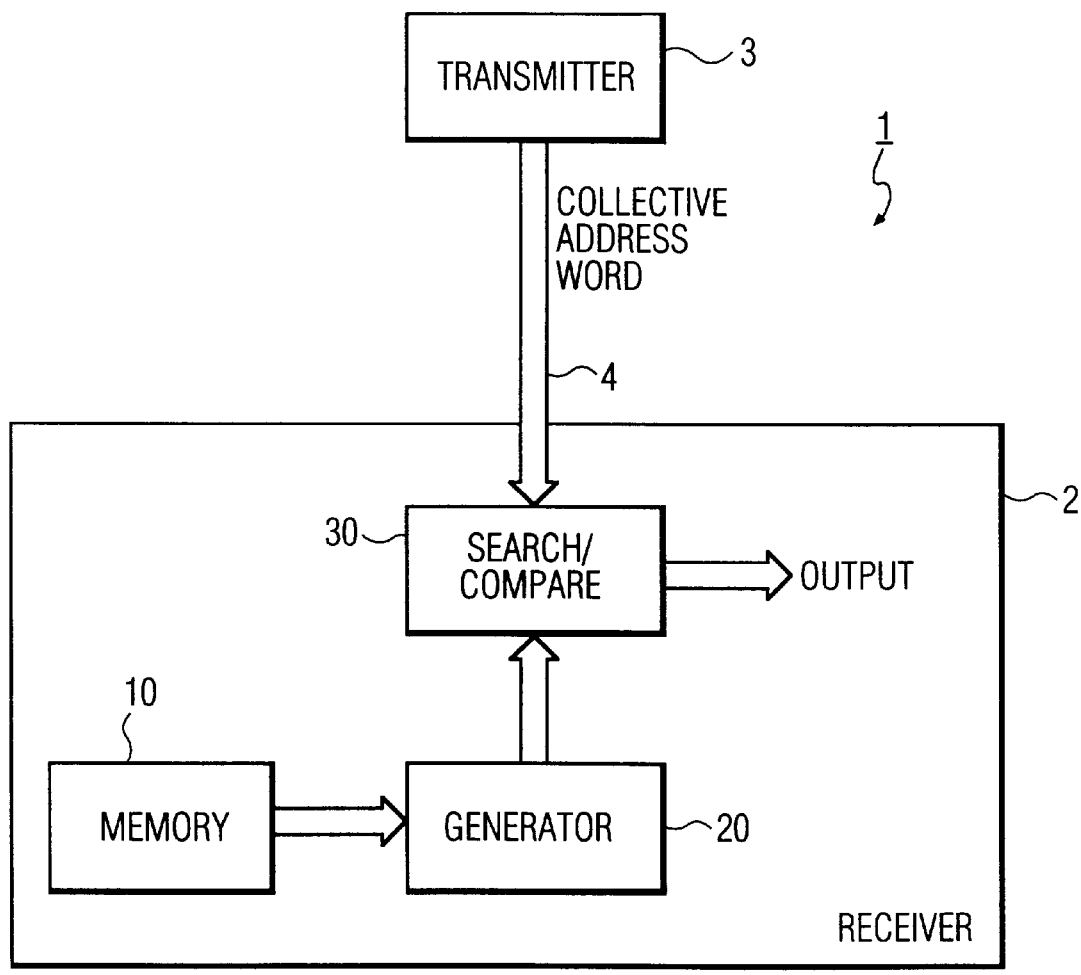
FIG. 4 shows a receiver in accordance with the invention.

The system of filtering messages for managing access rights defined by the MPEG standard ("Moving Picture Expert Group") and DVB ("Digital Video Broadcasting") provides a filtering length for the address of at least 40 bits. Nowadays, the manufacturers of integrated demultiplexing circuits conceive circuits having between four and five buffer memories for acquisition of these messages, each buffer memory being used for the acquisition of a message of any type (collective, shared or unique addresses).

An example of a collective address is shown in FIG. 1. It comprises a field of four bits having a value denoted CA6 as an abbreviation of "Collective Address No. 6", associated with an index value, here expressed by 0101 signifying a compulsory situation at position five (the possible positions ranging from 0 to 9). A message transmitted by a transmitter for specifying the collective address of FIG. 1 comprises an address word shown in FIG. 2. This word comprises ten fields of four bits each. All the fields are filled with zeroes with the exception of the field at position five, which contains the value CA6. As a modification it is also feasible that the non-significant fields are filled with ones. It should be noted that no useful address field is allowed to have the value 0000 or 1111.

The reception of a message using this type of addressing is then conditioned by the recognition, per group of four bits, of a conformity between the transmitted address word and the position of the address and its value. To ensure that this is recognized at the user end, a word of forty bits, that is, of a length equal to said overall length, is constructed for placing several fields end to end, each field corresponding to said contents of an address taken from said plurality of collective addresses available to the user receiver, and each of these contents is placed in its compulsory position. Such a word is shown in FIG. 3. Each address value CA1, CA2, etc., represented by a field of four bits, is placed in its compulsory position, for example the field with contents "CA6" is placed in position five.

This word is constructed by user receiver 2 shown in FIG. 4, as described below. In this regard, FIG. 4 shows a transmission system 1 which can be used to implement the present invention. Transmission system 1 includes transmitter 3 for transmitting a collective address word (i.e., the message noted above) to receiver 2. Receiver 2 includes memory 10 which contains information components defining a plurality of collective addresses which are different from each other but which concern a user; and generator 20 which generates several fields of bits, each of which corresponds to the contents of an address from memory 10, and which places these fields end-to-end so as to form the forty-bit word noted above. Block 30 then compares this word to the collective address word, and searches separately for an identical field in this word which is in compulsory positions of the received collective address word. Here, the message will be recognized because conformity will be found between the field CA6 of FIG. 2 and the field CA6 of FIG. 3. This mechanism thus provides the possibility of using a single buffer memory in the user receiver for treating a group of collective addresses at a time. The number of different collective addresses concerning a receiver may exceed ten. In this case, several words of the same type as that in FIG. 3 are constructed and each of them is compared with the word shown in FIG. 2. This may also be necessary if two addresses have the same compulsory position: they should therefore be introduced into two distinct words, each of the same type as that of FIG. 3. The comparison of several words of the same type as that of FIG. 3 may be made simultaneously by means of several identical circuits: the circuits which are integrated in the demultiplexing circuits mentioned above have between four and five buffer memories for acquisition of messages and each of these buffer memories may be used for comparing a different word, of the type shown in FIG. 3, with a word received from the transmitter, word of the type of FIG. 2.

It should be noted that there are other possibilities of defining the dimensions. For example, words of 32 bits in which fields of 4 bits have a position between 0 and 7, defined by three bits, or fields of five bits in a word of 40 bits, etc. are also feasible.

We claim:

1. A user-addressing method in an authorised access television system in which a transmitter transmits collective address words enabling selection of a group comprising a plurality of special users for each of these words, characterized in that a collective address word has a given overall length which is divided into several sections of equal length, placed end to end, a collective address is defined by
a data expressed by a field of bits having a length which is equal to the length of one of said sections, and
a compulsory position corresponding to one of said sections in the collective address word, a collective address word is transmitted by the transmitter in the form of a word having said overall length, whose section corresponding to the compulsory position for this address comprises the field of bits of the address and the rest of which is composed of bits which are all identical.

2. An addressing method as claimed in claim 1, characterized in that the memory in a receiver for a user contains information components defining a plurality of collective addresses which are different from each other and all of which concern said user, each component being stored in the form of two variables, one of which defines said compulsory position and the other defines the contents of said field of bits.

3. An addressing method as claimed in claim 2, characterized in that, at the user end, for recognising whether a message received from the transmitter concerns this user, a receiver word having a length which is equal to said overall length is constructed by placing several fields end to end, each corresponding to said contents of an address taken from said plurality of collective addresses available to the user receiver, each of these fields being placed in the compulsory position defined for the address, comparing this receiver word with the collective address word of the received message, while conformity between the receiver word and the collective address word is searched separately for each field, recognizing the message if one identical field is found.

4. An addressing method as claimed in claim 1, characterized in that said overall length covers forty bits and the length of the collective address covers four bits.

5. A receiver for enabling a user to receive transmissions in which collective addresses as claimed in claim 1 are used, provided with a memory which contains information components defining a plurality of collective addresses which are different from each other but all of which concern said user, characterized in that said receiver comprises means for generating several fields of bits each corresponding to said contents of an address taken from said plurality of collective addresses available to the user receiver, and for placing each of these fields end to end in the compulsory position defined for the address so as to constitute a word having a length which is equal to said overall length, means by which an identical field in the constituted word and in the collective address conveyed by the received message is searched separately for each field, when said receiver receives a message.

6. A receiver as claimed in claim 5, characterized in that it comprises, for each of said different collective addresses, a first memory location for a variable which defines said compulsory position and a second memory location for a variable which defines the contents of said field of bits.

7. An addressing method in an authorized access system, comprising the steps of:

defining collective address words for addressing a plurality of addresses, each collective address word having an overall length comprising several sections of equal length placed end to end, defining a collective address as a data expressed by a field of bits having a length equal to the length of one of said several sections, and a compulsory position corresponding to one of said sections in the collective address word, transmitting a collective address word in the form of a word having said overall length, whose section corresponding to the compulsory position for the collective address comprises the field of bits of the collective address and the remaining sections of the collective address word comprising bits which are all identical.

8. A signal for addressing an authorized access television system, comprising:

a collective address word having a given overall length which is divided into several sections of equal length, placed end to end;

a collective address being defined by:
a data expressed by a field of bits having a length equal to the length of one of said sections, and
a compulsory position corresponding to one of said sections in the collective address word; and wherein the collective address word is in the form of a word having said overall length, whose section corresponding to the compulsory position for this address comprises the field of bits of the address and the rest of which being composed of bits which are all identical.

* * * * *